United States Patent Office 2,849,440
Patented Aug. 26, 1958

2,849,440

PRODUCTION OF ORGANIC ACID ESTERS OF CELLULOSE BY THE HOMOGENEOUS PROCESS

Henry W. Steinmann, Madison, N. J., assignor to Celanese Corporation of America, New York, N. Y., a corporation of Delaware No Drawing. Application August 16, 1955
Serial No. 528,830

15 Claims. (Cl. 260—227)

This invention relates to the production of organic acid esters of cellulose and relates more particularly to an improved process for the production of organic acid esters of cellulose by the homogeneous or solution process.

This application is a continuation-in-part of my application, Ser. No. 443,957, filed July 16, 1954.

An important object of this invention is to provide an improved process for dewatering water-containing solutions of organic acid esters of cellulose in water-immiscible solvents.

Other objects of this invention will be apparent from the following detailed description and claims.

In my copending application, referred to above, there is disclosed a process for the production of organic acid esters of cellulose in which cellulose is esterified with an organic acid anhydride in the presence of a water-immiscible solvent for the cellulose ester being formed. At the completion of the esterification, there is obtained a homogeneous solution of the ester in the water-immiscible solvent, which solution also contains some organic acid anhydride, organic acid, esterification catalyst and other impurities. In order to remove impurities therefrom, the esterification solution is subjected to a two-phase extraction with an aqueous medium under such conditions that no precipitation of the organic acid ester of cellulose from the solution takes place. The extracted solution, while free from the bulk of the impurities originally present therein, contains an undesirably high proportion of water and should have at least a portion of the water removed therefrom before it is employed for the spinning of filaments, the casting of films, or the manufacture of other articles.

According to the present invention, water is removed from a water-containing solution of an organic acid ester of cellulose in a water-immiscible solvent by contacting the said solution with a solid dehydrating agent that is insoluble in the said solution, which dehydrating agent is preferably in particulate form, and then separating the solution and the dehydrating agent. Through the use of this process, the proportion of water in the organic acid ester of cellulose solutions may be readily reduced to any desired level without the necessity of heating or otherwise specially treating the said solution. In this way, the elimination of water from the solution may be effected without changing the properties of the solution in an undesirable manner.

While any of a large number of solid dehydrating agents may be employed to remove the water from the organic acid ester of cellulose solution, the best results are obtained when silica gel is employed for this purpose since it gives a substantially complete removal of the water from the solution in an extremely short period of time. Another valuable class of dehydrating agents are salts that will combine with water and are soluble in water to the extent of at least about 10 grams per liter at 25° C. Preferably, the salts or mixture of salts should also have an alkaline reaction to neutralize any traces of acid esterification catalyst and organic acid that remain in the organic acid ester of cellulose solution. Examples of suitable salts or salt mixtures that meet these requirements are anhydrous sodium carbonate, anhydrous magnesium sulfate, anhydrous sodium sulfate, anhydrous calcium chloride, mixtures of anhydrous magnesium sulfate and anhydrous magnesium oxide, mixtures of anhydrous sodium sulfate and anhydrous sodium carbonate. The calcium chloride is normally alkaline owing to the presence therein of small amounts of calcium oxide, calcium hydroxide, calcium carbonate, or mixtures of the same.

Prior to carrying out the esterification the cellulose may advantageously be pretreated, according to the usual practice in the art, to increase its reactivity and thereby shorten the esterification time. Such pretreatment may be effected by adding to the cellulose small quantities of a lower aliphatic acid such as, for example, formic acid, acetic acid, propionic acid or butyric acid as well as mixtures thereof. There may also be added to the cellulose during the pretreatment all or a portion of the esterification catalyst. The pretreatment of the cellulose may be carried out in a single stage, or in a plurality of stages, all as well known in the art.

The pretreated cellulose is then esterified with an organic acid anhydride corresponding to the organic acid ester of cellulose being formed in the presence of a water-immiscible solvent for the said ester. Suitable water-immiscible solvents for this purpose include, for example, nitromethane, m-cresol, cyclopentanone, pyrrole and furfural. Chlorinated hydrocarbon solvents such as methylene chloride, tetrachloroethane, trichloroethane, trichloroethanol and chloroform may also be employed for this purpose. Extremely valuable results are obtained when methylene chloride is employed as the solvent since it yields solutions that are especially well suited for spinning. Instead of employing a single material as the solvent, a mixture of materials, such as those specified above, may be used for this purpose. The quantity of solvent may range from the minimum necessary to dissolve the organic acid ester of cellulose being formed to any desired maximum. The use of excessively large quantities of solvent is, however, economically undesirable since it involves an added expense in recovering the solvent. When methylene chloride is employed as the solvent, good results have been obtained with from about 700 to 2500 parts by weight of methylene chloride for each 100 parts by weight of cellulose. The quantity of organic acid anhydride is not critical, good results having been obtained with from about 2.4 to 3.2 moles of organic acid anhydride for each 100 parts by weight of cellulose. The quantity of organic acid anhydride specified is in excess of that required to react with any water which may be introduced into the esterification mixture with the cellulose, the pretreating agent, the water-immiscible solvent or from any other source.

The esterification is normally carried out in the presence of an esterification catalyst, which may, for example, be sulfuric acid, perchloric acid, anhydrous ferric chloride, or aromatic and alkyl sulfonic acids. The quantity of such catalyst may range from as little as about 0.5% by weight, or less, to as much as about 5% by weight, or even more, based on the weight of the cellulose, with smaller quantities of catalyst requiring longer reaction times and larger quantities of catalyst requiring shorter reaction times. The esterification reaction is normally carried out at temperatures of between about 0 to 50° C.

As the esterification proceeds, the organic acid ester of cellulose being formed will dissolve in the esterification mixture so that at the end of the esterification there will be obtained a substantially homogeneous solution. This solution will contain, in addition to the organic acid ester of cellulose and the water-immiscible solvent therefor, the esterification catalyst, the unreacted organic acid anhydride and a certain proportion of organic acid. The organic acid is derived from a number of sources including the pretreatment acid, the organic acid that is formed by the reaction of the organic acid anhydride with any water that is present in the esterification mixture, the organic acid that is formed by the esterification reaction and any organic acid that is initially present in the organic acid anhydride.

As disclosed in my copending application Serial No. 470,825, filed November 23, 1954 now abandoned, the acid esterification catalyst, such as perchloric acid may then be neutralized with a nitrogenous base that will react therewith to form an ammonium perchlorate. Suitable nitrogenous bases that may be used for this purpose are ammonia and amines, including aliphatic and aromatic primary, secondary and tertiary amines, as well as amines in which the nitrogen atom forms a part of a heterocyclic ring. Examples of such nitrogenous bases are ammonia, diethylamine, piperidine, quinoline, pyridine, triethylamine, aniline, ethylamine, trimethylamine and dimethylamine. The nitrogenous bases are soluble in the esterification solution and react with the perchloric acid present therein to give ammonium perchlorates which may be substituted or not. On extraction of the esterification solution with an aqueous medium, the ammonium perchlorates enter the aqueous phase readily, showing no tendency to be absorbed or adsorbed by the colloidal or sub-colloidal particles of the organic acid ester of cellulose. The quantity of nitrogenous base that is employed should be at least sufficient to neutralize all of the perchloric acid, quantities providing a 10 to 50% molar excess of the nitrogenous base as compared with the perchloric acid, being preferred. The nitrogenous base may be added to the esterification solution per se, or may be added to the esterification solution together with a sufficient quantity of water to convert all the organic acid anhydride remaining in the said solution to the corresponding organic acid.

For many purposes, it is desirable to ripen or partially hydrolyze the organic acid ester of cellulose to increase the average number of free hydroxyl groups per anhydroglucose unit in the cellulose molecule. Such ripening may be readily carried out by adding sufficient water to the solution to convert any remaining organic acid anhydride to the corresponding acid, together with an excess of water which may range from about 50 to 100 parts by weight for each 100 parts by weight of cellulose. Following the addition of the water, the solution is held, preferably with agitation, until the desired degree of hydrolysis has taken place. The temperature of the solution may be raised to increase the speed of the ripening process. It may also be desirable in some cases to add a quantity of a mineral acid to the solution to accelerate the ripening, or it may be desirable to neutralize all or a portion of the acid esterification catalyst to slow down the ripening. The addition of further quantities of mineral acid to the ripening solution or the neutralization of all or a portion of the acid catalyst therein may be effected at the beginning of the ripening process or after the ripening has proceeded to some extent. If the ripening is carried to the point where there is an appreciable reduction in the number of the ester groups in the organic acid ester of cellulose, it is desirable to add to the ripening solution a small proportion of a water-miscible solvent, such as methanol, ethanol, or the like to avoid the precipitation of the ripened organic acid ester of cellulose from the water-immiscible solvent. In this case, it may also be desirable to have present in the aqueous medium employed for the extraction step, a low percentage of a water-miscible solvent to prevent the precipitation of the organic acid ester of cellulose.

To effect the partial or complete neutralization of the acid esterification catalyst during the ripening of the organic acid ester of cellulose, there is employed a nitrogenous base as specified above so that the ammonium salt formed on neutralization will be readily removed from the esterification solution during the extraction thereof with an aqueous medium. After the ripening of the organic acid ester of cellulose is complete a nitrogenous base is added to the esterification solution in an amount at least sufficient to neutralize all the acid esterification catalyst present therein as well as all the mineral acid that may have been added during the ripening step. Preferably, as pointed out above, there is added to the esterification solution an excess of nitrogenous base.

The solution of organic acid ester of cellulose is then subjected to a two-phase extraction with an aqueous medium to remove therefrom the organic acids, salts and other water-soluble substances present therein. During the extraction, the proportion of water-immiscible solvent should be sufficiently high so that no precipitation of the organic acid ester of cellulose from solution will take place. The solution does develop a cloudy appearance during the extraction with an aqueous medium, which cloudiness is probably due to the formation of an emulsion. However, since there is no separation of the organic acid ester of cellulose from the emulsion, it will hereinafter also be referred to as a solution.

The necessary proportion of water-immiscible solvent will depend, among other things, on the concentration of the organic acid ester of cellulose, the amount of organic acid present, the concentration of salts, and the temperature of the solution. For any given set of conditions, the necessary proportion of water-immiscible solvent may be readily ascertained. In some cases, the amount of water-immiscible solvent necessary to avoid precipitation during the extraction may be present in the esterification solution from the very outset. However, this may, in some cases greatly increase the dilution of the esterification soluton above that required for the esterification itself and thereby reduce the quantity of organic acid ester of cellulose that can be prepared in a reactor of given volume. In such cases, it may be desirable to carry on the esterification in the presence of a smaller amount of water-immiscible solvent and then add to the esterification solution, before or after ripening the same, a further quantity of water-immiscible solvent before extracting the solution with an aqueous medium. The addition of a further quantity of water-immiscible solvent also reduces the viscosity of the solution whereby it may be handled more easily and whereby the extraction will proceed more rapidly. When the extraction is carried out without first ripening the organic acid ester of cellulose, the esterification solution will normally have present therein a certain proportion of organic acid anhydride. At the beginning of the extraction this organic acid anhydride will be converted to the corresponding organic acid by reaction with the extraction water brought into contact with the esterification solution.

The aqueous medium employed for the extraction may be water itself. There may also be used a mixture of water and a water-miscible solvent or partially water-miscible solvent such as methanol, ethanol, normal propanol, isopropanol, ethyl acetate, pyridine, acetone and methyl acetate. The addition of the water-miscible solvent offers the advantage that the extraction proceeds more rapidly than when water alone is used as the extractant. However, in this case, the organic acid ester of cellulose solution obtained will contain a certain proportion of the water-miscible solvent which may be undesirable.

The extraction of the esterification solution may be carried out on a batch basis by mixing the said solution with an aqueous medium, permitting the solution to stand whereby it will separate into two phases, and then separating the two phases from contact with each other. This sequence of steps is then repeated as many times as necessary to remove from the esterification solution the water-soluble impurities present therein. Preferably, however, the extraction is carried out in a continuous manner. For example, the esterification solution may be passed through one or more extraction columns into which one or more streams of aqueous medium is introduced and through which the aqueous medium flows concurrent with or countercurrent to the esterification solution. During the extraction, the water-soluble impurities that are present in the esterification solution, including organic acids and salts, dissolve in the water and are thereby effetcively removed from the said esterification solution.

At the end of the extraction step there is obtained a solution of the organic acid ester of cellulose in the water-immiscible solvent which contains only a small proportion of water-soluble impurities, but which contains a relatively high proportion of water. The said solution is then contacted with the solid dehydrating agent to remove the water therefrom, following which the solution and the dehydrating agent are separated. The dehydrating agent and the solution being treated may be mixed with stirring and held together for a sufficient period of time to permit the water to be picked up by the dehydrating agent. If, as is preferred, the dehydrating agent has an alkaline reaction, it will during this period also react with any traces of organic acid and acid esterification catalyst that remain in the solution. The mixing of the dehydrating agent and the solution may be carried out on a batch basis or in a continuous manner, as desired. After the dehydrating agent has picked up the desired proportion of water from the solution, it is separated from the solution, for example, by filtering or with the aid of a centrifuge. The solution may also be passed through a bed of the dehydrating agent. When this is done, and particularly when silica gel is employed as the dehydrating agent, it is desirable to wet the dehydrating agent with the solvent in which the organic acid ester of cellulose is dissolved before passing the solution through the bed. Otherwise, the heat evolved by the wetting of the silica gel might cause local precipitation of the organic acid ester of cellulose. The used dehydrating agent may be regenerated for further use in a manner well known in the art, for example, by passing a current of heated air therethrough.

The proportion of dehydrating agent employed should, in general, be sufficient to pick up substantially all the water present in the solution being treated and preferably an excess of dehydrating agent should be employed. The precise amount of dehydrating agent needed will depend upon the proportion of water in the solution being treated and the nature of the dehydrating agent. Generally, the dehydrating agent should be used in an excess of about 20%, or even more, over that theoretically required to pick up all the water in the solution. When a smaller proportion of dehydrating agent is used, there is a tendency for an undesirably high proportion of water to remain in the solution being dewatered and, what is even more objectionable where the dehydrating agent is water-soluble, for the dehydrating agent to dissolve in said water whereby the ash content of the treated solution will be excessive.

The process of this invention may be applied to the solutions of organic acid esters of cellulose directly after they have been extracted with an aqueous medium. It may also be applied to such solutions after they have been subjected to a preliminary treatment to remove a portion of the water therefrom. In the latter case, the treatment of the solution with a solid dehydrating agent may, with advantage, serve to reduce the water content of the solution to the level desired for its intended use.

After the solution has been dehydrated, it will usually be desirable to remove a portion of the water-immiscible solvent therefrom to increase the concentration of the said solution so that it will be better suited for spinning operations. The removal of a portion of the solvent may be effected without difficulty by distilling the solvent from the solution. In some cases, it may, on the other hand, be preferred to add a further quantity of solvent to the solution to reduce the concentration of the organic acid ester of cellulose therein. The spinning properties of the solution may also be improved by adding thereto a proportion of a second and different solvent. For example, when methylene chloride is the water-immiscible solvent, the spinning properties of the solution may be improved by adding thereto a lower aliphatic alcohol such as methanol, ethanol, normal propanol or isopropanol. There may also be added to the solution pigments, dyes, plasticizers, fire-retardants and other materials capable of altering the appearance or properties of the final products.

It may also be desirable to treat the solution with a decolorizing agent such as activated charcoal, diatomaceous earth or fuller's earth to remove therefrom color-producing materials. When silica gel is used as the dehydrating agent it tends to remove color-producing materials from the solution so that no separate treatment is required to remove these materials from the solution. The solution may also be filtered to remove particles therefrom such as bits of unacetylated cellulose, dirt and the like.

The solution of organic acid ester of cellulose obtained in this manner is well suited for spinning by conventional spinning techniques to form filaments, films and the like as well as for coatings and similar purposes. It is free from impurities that would interfere with the spinning operation or impair the properties of the products produced therefrom. Because no precipitation steps are involved in preparing the solutions, important economies can be achieved in such preparation. The organic acid ester of cellulose may, if desired, also be precipitated from such solution by mixing the same with a large excess of a non-solvent for the organic acid ester of cellulose, in which case there will be obtained a product which needs no further purification to prepare it for use.

The process of this invention is generally suited for the production of organic acid esters of cellulose, regardless of their degree of substitution. It is especially well suited for the production of organic acid esters of cellulose having a high degree of substitution such as tri-esters or cellulose esters having fewer than 0.2 free hydroxyl groups per anhydroglucose unit in the cellulose molecule, since it avoids the difficulties that are normally encountered in preparing such esters by the solution process.

The invention will now be described specifically in connection with the production of cellulose acetate which is commercially the most important organic acid ester of cellulose at the present time. However, it may also be employed for the production of other organic acid esters of cellulose including cellulose propionate, cellulose butyrate, cellulose acetate formate, cellulose acetate propionate, cellulose acetate butyrate and cellulose benzoate.

The following examples are given to illustrate this invention further

*Example 1*

Cellulose is pretreated for 120 minutes with 35% by weight of glacial acetic acid, and the pretreated cellulose is esterified with, for each 100 parts by weight of bone dry cellulose 750 parts by weight of methylene chloride, 300 parts by weight of acetic anhydride and 1 part by weight of perchloric acid. The solution obtained is diluted with methylene chloride to bring its cellulose acetate concentration to 10.6% by weight and the solution is extracted with 1 volume of water countercurrently. The resultant cloudy solution contains 4.09% by weight of water, 0.5% by weight of acetic acid and 0.020% by weight of perchlorate. The solution is mixed with 10% by weight of anhydrous sodium carbonate particles and stirred for 15 minutes at room temperature, then the sodium carbonate is removed from the solution by means of a centrifuge. The solution obtained is clear, contains 0.22% by weight of water, less than 0.01% by weight of acetic acid as shown by the fact that the solution gives a slight acid reaction that is too faint to be titrated when an indicator is added, and 0.004% of perchlorates which is within the limits of accuracy of the perchlorate analysis. The proportion of anhydrous sodium carbonate employed above that required to react with the acetic acid is 250% of that theoretically required to combine with all the water, assuming that the sodium carbonate reacts to form a decahydrate. There is no change during the treatment in the acetyl value of the cellulose acetate which is 62.3.

Example II

The cellulose acetate solution of Example I is diluted with methylene chloride to bring its solids content to 5.5% by weight. The said solution, which is cloudy, contains 2.20% by weight of water, 0.2% by weight of acetic acid and 0.010% by weight of perchlorates. The solution is mixed with 3% by weight of anhydrous sodium carbonate particles and stirred for 15 minutes at room temperature, then the sodium carbonate is removed from the solution by means of a centrifuge. The solution obtained is clear, contains 0.18% by weight of water, less than 0.01% by weight of acetic acid and 0.009% by weight of perchlorates.

Example III

A cellulose acetate solution containing 1.59% by weight of water, 0.1% by weight of acetic acid and 12.0% by weight of cellulose triacetate, all dissolved in methylene chloride, is mixed with 5% by weight, based on the weight of the solution, of anhydrous calcium chloride particles. The mixture so formed is shaken for 15 minutes at room temperature and then centrifuged to separate the solid phase. The supernatant liquid contains 0.28% by weight of water, less than 0.1% by weight of acetic acid and 12.3% by weight of cellulose acetate, all dissolved in methylene chloride.

Example IV

The cellulose acetate solution of Example III is mixed with 2.5% by weight, based on the weight of the solution, of anhydrous magnesium sulfate particles. The mixture so formed is shaken for 15 minutes at room temperature and then centrifuged to separate the solid phase. The supernatant liquid contains 0.21% by weight of water, 0.1% by weight of acetic acid and 12.3% by weight of cellulose triacetate.

Example V

There is placed into a cylindrical container 12 inches in diameter and 6.5 inches deep and having a perforated supporting plate therein, a bed, 1.5 inches deep, of silica gel particles that will pass through a 6 mesh screen and be retained on a 12 mesh screen (U. S. Standard). Methylene chloride is passed through the bed, liberating a large amount of heat as the silica gel adsorbs the methylene chloride. After the liberation of heat ceases, there is passed through the bed at the rate of 6 pounds per hour, a solution in methylene chloride containing 11.1% by weight of cellulose triacetate, 1.67% by weight of water and 0.2% by weight of acetic acid, which solution has an ash content of 0.003% by weight. The solution emerging from the container is clear and contains 11.3% by weight of cellulose triacetate, 0.15% by weight of water and 0.1% by weight of acetic acid and has an ash content of 0.003% by weight.

Example VI

The cellulose acetate solution of Example V is mixed with 5% by weight of silica gel particles. The mixture so formed is shaken for 5 minutes at room temperature and then centrifuged to separate the solid phase. The supernatant liquid is clear and contains 11.5% by weight of cellulose triacetate, 0.18% by weight of water, 0.1% by weight of acetic acid and has an ash content of 0.003% by weight.

It is to be understood that the foregoing detailed description is given merely by way of illustration and that many variations may be made therein without departing from the spirit of my invention.

Having described my invention what I desire to secure by Letters Patent is:

1. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, subjecting the solution to a two-phase extraction with an aqueous medium to remove water-soluble material from the esterification solution, there being present during the extraction a sufficient proportion of water-immiscible solvent to prevent precipitation of the organic acid ester of cellulose from the solution, and removing water from the extracted solution by contacting the solution with a solid dehydrating agent that is insoluble in said solution, and separating the solution and the dehydrating agent.

2. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, subjecting the solution to a two-phase extraction with an aqueous medium to remove water-soluble materials from the esterification solution, there being present during the extraction a sufficient proportion of water-immiscible solvent to prevent precipitation of the organic acid ester of cellulose from the solution, and removing water from the extracted solution by contacting the solution with silica gel, and separating the solution and the silica gel.

3. In a process for the production of organic acid esters of cellulose, the steps which comprise esterifying cellulose with an organic acid anhydride in the presence of a water-immiscible solvent for the ester being formed whereby there will be obtained at completion of the esterification a substantially homogeneous solution, subjecting the solution to a two-phase extraction with an aqueous medium to remove water-soluble materials from the esterification solution, there being present during the extraction a sufficient proportion of water-immiscible solvent to prevent precipitation of the organic acid ester of cellulose from the solution, and removing water from the extracted solution by contacting the solution with a solid water-soluble salt that will combine with water and is insoluble in said solution, and separating the solution and the salt.

4. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, subjecting the solution to a two-phase extraction with an aqueous medium to remove water-soluble materials from the esterification solution, there being present during the extraction a sufficient proportion of water-immiscible solvent to prevent precipitation of the organic acid ester of cellulose from the solution, and removing water from the extracted solution by contacting the solution with a solid water-soluble salt having an alkaline reaction that will combine with water and is insoluble in said solution, and separating the solution and the salt, the amount of salt being in excess of that theoretically required to combine with all the water present.

5. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, subjecting the solution to a two-phase extraction with an aqueous medium to remove water-soluble materials from the esterification solution, there being present during the extraction a sufficient proportion of water-immiscible solvent to prevent precipitation of the organic acid ester of cellulose from the solution, and removing water from the extracted solution by contacting the solution with anhydrous sodium carbonate, and separating the solution and the sodium carbonate.

6. In a process for the production of cellulose acetate, the steps which comprise esterifying cellulose with acetic anhydride in the presence of a water-immiscible solvent for the cellulose acetate being formed whereby there will be obtained at the completion of the esterification a substantially homogeneous solution, subjecting the solution to a two-phase extraction with an aqueous medium to remove water-soluble materials from the esterification solution, there being present during the extraction a sufficient proportion of water-immiscible solvent to prevent precipitation of the cellulose acetate from the solution, and removing water from the extracted solution by contacting the solution with a solid dehydrating agent that is insoluble in said solution, and separating the solution and the dehydrating agent.

7. In a process for the production of cellulose acetate, the steps which comprise esterifying cellulose with acetic anhydride in the presence of a water-immiscible solvent for the cellulose acetate being formed whereby there will be obtained at the completion of the esterification a substantially homogeneous solution, subjecting the solution to a two-phase extraction with an aqueous medium to remove water-soluble materials from the esterification solution, there being present during the extraction a sufficient proportion of water-immiscible solvent to prevent precipitation of the cellulose acetate from the solution, and removing water from the extracted solution by contacting the solution with silica gel, and separating the solution and the silica gel.

8. In a process for the production of cellulose acetate, the steps which comprise esterifying cellulose with acetic anhydride in the presence of a water-immiscible solvent for the cellulose acetate being formed whereby there will be obtained at the completion of the esterification a substantially homogeneous solution, subjecting the solution to a two-phase extraction with an aqueous medium to remove water-soluble materials from the esterification solution, there being present during the extraction a sufficient proportion of water-immiscible solvent to prevent precipitation of the cellulose acetate from the solution, and removing water from the extracted solution by contacting the solution with a solid salt having an alkaline reaction that will combine with water and is insoluble in said solution, and separating the solution and the salt, the salt having a solubility in water of at least about 10 grams per liter at 25° C., and the amount of salt being in excess of that theoretically required to combine with all the water present.

9. In a process for the production of cellulose acetate, the steps which comprise esterifying cellulose with acetic anhydride in the presence of a water-immiscible solvent for the cellulose acetate being formed whereby there will be obtained at the completion of the esterification a substantially homogeneous solution, subjecting the solution to a two-phase extraction with an aqueous medium to remove water-soluble materials from the esterification solution, there being present during the extraction a sufficient proportion of water-immiscible solvent to prevent precipitation of the cellulose acetate from the solution, and removing water from the extracted solution by contacting the solution with anhydrous sodium carbonate, and separating the solution and the sodium carbonate.

10. In a process for the production of cellulose acetate, the steps which comprise esterifying cellulose with acetic anhydride in the presence of methylene chloride whereby there will be obtained at the completion of the esterification a substantially homogeneous solution, subjecting the solution to a two-phase extraction with an aqueous medium to remove water-soluble materials from the esterification solution, there being present during the extraction a sufficient proportion of methylene chloride to prevent precipitation of the cellulose acetate from the solution, and removing water from the extracted solution by contacting the solution with a solid dehydrating agent that is insoluble in said solution, and separating the solution and the dehydrating agent.

11. In a process for removing water from a water-containing solution of an organic acid ester of cellulose in a water-immiscible solvent, the steps which comprise contacting the solution with a solid dehydrating agent that is insoluble in said solution, and separating the solution and the dehydrating agent.

12. In a process for removing water from a water-containing solution of an organic acid ester of cellulose in a water-immiscible solvent, the steps which comprise contacting the solution with silica gel and separating the solution and the silica gel.

13. In a process for removing water from a water-containing solution of cellulose acetate in a water-immiscible solvent, the steps which comprise contacting the solution with a solid dehydrating agent that is insoluble in said solution, and separating the solution and the dehydrating agent.

14. In a process for removing water from a water-containing solution of cellulose acetate in a water-immiscible solvent, the steps which comprise contacting the solution with a solid salt having an alkaline reaction that will combine with water and is insoluble in said solution, and separating the solution and the salt, the salt having a solubility in water of at least about 10 grams per liter at 25° C., and the amount of salt being in excess of that theoretically required to combine with all the water present.

15. In a process for removing water from a water-containing solution of cellulose acetate in methylene chloride, the steps which comprise contacting the solution with silica gel, and separating the solution and the silica gel.

References Cited in the file of this patent

UNITED STATES PATENTS

| | | |
|---|---|---|
| 1,919,002 | Whitehead | July 18, 1933 |
| 2,059,381 | Martin | Nov. 3, 1936 |
| 2,126,190 | Hofmann | Aug. 9, 1938 |
| 2,214,943 | Tinsley | Sept. 17, 1940 |

OTHER REFERENCES

Vogel, "Practical Organic Chemistry" (1948) Longman's, Green and Co., pp. 139–143.

Mantell, "Adsorption," 2d Ed. (1951) McGraw-Hill Book Co., Inc. (page 381).